United States Patent
Yamada et al.

(10) Patent No.: US 11,650,056 B2
(45) Date of Patent: May 16, 2023

(54) PHYSICAL QUANTITY DETECTION CIRCUIT, PHYSICAL QUANTITY SENSOR, ELECTRONIC APPARATUS, VEHICLE, AND OPERATION METHOD OF PHYSICAL QUANTITY DETECTION CIRCUIT

(71) Applicant: SEIKO EPSON CORPORATION, Tokyo (JP)

(72) Inventors: Hideyuki Yamada, Minowa-Machi (JP); Hideo Haneda, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 394 days.

(21) Appl. No.: 16/751,584

(22) Filed: Jan. 24, 2020

(65) Prior Publication Data

US 2020/0240785 A1    Jul. 30, 2020

(30) Foreign Application Priority Data

Jan. 29, 2019  (JP) .............................. JP2019-013422

(51) Int. Cl.
*G01C 19/5776* (2012.01)
*G01C 19/5649* (2012.01)

(52) U.S. Cl.
CPC ..... *G01C 19/5776* (2013.01); *G01C 19/5649* (2013.01)

(58) Field of Classification Search
CPC ............ G01C 19/5776; G01C 19/5649; G01C 19/5614; G01C 19/5726; H03M 1/12
See application file for complete search history.

(56) References Cited

U.S. PATENT DOCUMENTS

| 8,099,073 B1* | 1/2012 | Muller ................. H04B 1/0483 455/296 |
| 2016/0269011 A1 | 9/2016 | Uehara et al. |
| 2018/0019717 A1* | 1/2018 | Murashima .......... H03G 1/0094 |
| 2018/0123524 A1* | 5/2018 | Polesel .................... H03F 3/393 |
| 2020/0119697 A1* | 4/2020 | Subramanian ...... H03F 3/45475 |

FOREIGN PATENT DOCUMENTS

| DE | 102016109332 | * 12/2016 | ......... G01C 19/5776 |
| JP | 2016-171493 A | 9/2016 | |
| JP | 2016171493 | * 9/2016 | ......... H03K 5/15013 |
| JP | 2016-189515 A | 11/2016 | |
| JP | 2018-166272 A | 10/2018 | |

* cited by examiner

*Primary Examiner* — Alexander Satanovsky
(74) *Attorney, Agent, or Firm* — Workman Nydegger

(57) ABSTRACT

A physical quantity detection circuit includes a passive filter that receives a first analog signal based on an output signal of a physical quantity detection element, an analog/digital conversion circuit, and a precharge circuit that includes an operational amplifier, a first chopper circuit provided between the passive filter and the operational amplifier, and a second chopper circuit provided between the operational amplifier and the input capacitance of the analog/digital conversion circuit and precharges an input capacitance of the analog/digital conversion circuit, the first and the second chopper circuits perform a chopping operation in synchronization with an operation that the analog/digital conversion circuit samples the second analog signal at the input capacitance, based on an output signal of the passive filter.

9 Claims, 12 Drawing Sheets

PHYSICAL QUANTITY DETECTION CIRCUIT, PHYSICAL QUANTITY SENSOR, ELECTRONIC APPARATUS, VEHICLE, AND OPERATION METHOD OF PHYSICAL QUANTITY DETECTION CIRCUIT

The present application is based on, and claims priority from JP Application Serial Number 2019-013422, filed Jan. 29, 2019, the disclosure of which is hereby incorporated by reference herein in its entirety.

BACKGROUND

1. Technical Field

The present disclosure relates to a physical quantity detection circuit, a physical quantity sensor, an electronic apparatus, a vehicle, and an operation method of the physical quantity detection circuit.

2. Related Art

Currently, in various systems and electronic apparatuses, physical quantity sensors capable of detecting various physical quantities such as a gyro sensor that detects angular velocity and an acceleration sensor that detects acceleration, are widely used. Recently, in particular, in order to construct a highly reliable system, a physical quantity sensor that outputs physical quantity detection information as digital data with high noise resistance is used.

In JP-A-2016-171493, in a circuit device applied to a gyro sensor or the like, the circuit device including a detection circuit that performs analog front-end processing on a detection signal from a physical quantity transducer, a passive low-pass filter that performs low-pass filter processing on an output signal of the detection circuit, an A/D conversion circuit that samples the output signal of the passive low-pass filter, performs A/D conversion, and outputs a result as a digital signal, and a precharge circuit provided between the passive low-pass filter and the A/D conversion circuit, is described.

According to the circuit device disclosed in JP-A-2016-171493, since the output signal of the passive low-pass filter is buffered by the buffer circuit before the A/D conversion circuit samples the output signal of the passive low-pass filter to precharge the input capacitance of the A/D conversion circuit, even when the driving capability of the passive low-pass filter is low, a correct digital signal can be output.

However, in the circuit device described in JP-A-2016-171493, since 1/f noise generated in each operational amplifier configuring the buffer circuit is included in the output signal of the buffer circuit, the noise level of the input signal is increased by precharging the input capacitance of the A/D conversion circuit by the buffer circuit. Therefore, the circuit device described in JP-A-2016-171493 has room for improvement in order to reduce the noise level of the input signal of the A/D conversion circuit and further improve the accuracy of the digital signal output from the A/D conversion circuit.

SUMMARY

An aspect of a physical quantity detection circuit according to the present disclosure includes a passive filter that receives a first analog signal based on an output signal of a physical quantity detection element; an analog/digital conversion circuit that includes an input capacitance and converts a result obtained by sampling a second analog signal based on an output signal of the passive filter at the input capacitance into a digital signal; and a precharge circuit that is provided in a signal path between the passive filter and the analog/digital conversion circuit, and precharges the input capacitance, before the analog/digital conversion circuit samples the second analog signal at the input capacitance, in which the precharge circuit includes an operational amplifier, a first chopper circuit that is provided in a signal path between the passive filter and the operational amplifier, and a second chopper circuit that is provided in a signal path between the operational amplifier and the analog/digital conversion circuit, and the first chopper circuit and the second chopper circuit perform a chopping operation in synchronization with an operation that the analog/digital conversion circuit samples the second analog signal at the input capacitance.

In the aspect of the physical quantity detection circuit, the passive filter may be a low-pass filter.

In the aspect of the physical quantity detection circuit, the analog/digital conversion circuit may be a successive approximation type analog/digital conversion circuit.

In the aspect of the physical quantity detection circuit, each of the first analog signal and the second analog signal may be a differential signal.

In the aspect of the physical quantity detection circuit, the physical quantity detection circuit may further include a signal conversion circuit that converts an output signal of the physical quantity detection element into a voltage; and a detection circuit that detects a third analog signal based on an output signal of the signal conversion circuit and outputs the first analog signal.

An aspect of a physical quantity sensor according to the present disclosure includes the aspect of the physical quantity detection circuit described above; and the physical quantity detection element.

An aspect of an electronic apparatus according to the present disclosure includes the aspect of the physical quantity sensor described above.

An aspect of a vehicle according to the present disclosure includes the aspect of the physical quantity sensor described above.

An aspect of an operation method of a physical quantity detection circuit according to the present disclosure is an operation method of a physical quantity detection circuit including a passive filter that receives a first analog signal based on an output signal of a physical quantity detection element, an analog/digital conversion circuit that includes an input capacitance and converts a result obtained by sampling a second analog signal based on an output signal of the passive filter at the input capacitance into a digital signal, and a precharge circuit that is provided in a signal path between the passive filter and the analog/digital conversion circuit, and the precharge circuit includes an operational amplifier, a first chopper circuit that is provided in a signal path between the passive filter and the operational amplifier, and a second chopper circuit that is provided in a signal path between the operational amplifier and the analog/digital conversion circuit, the method including: a precharge step of precharging the input capacitance based on an output signal of the operational amplifier by the precharge circuit; a sampling step of sampling the second analog signal at the input capacitance by the analog/digital conversion circuit after the precharge step; and a chopping step of performing a chopping operation by the first chopper circuit and the second chopper circuit in synchronization with the sampling step.

DESCRIPTION OF EXEMPLARY EMBODIMENTS

Hereinafter, preferred embodiments of the present disclosure will be described in detail with reference to the drawings. The embodiments described below do not unduly limit the contents of the present disclosure described in the appended claims. Also, not all of the configurations described below are essential constituent requirements of the present disclosure.

Hereinafter, a physical quantity sensor that detects an angular velocity as a physical quantity, that is, an angular velocity sensor will be described as an example.

1. Physical Quantity Sensor 1-1. Configuration of Physical Quantity Sensor

Figure 1:
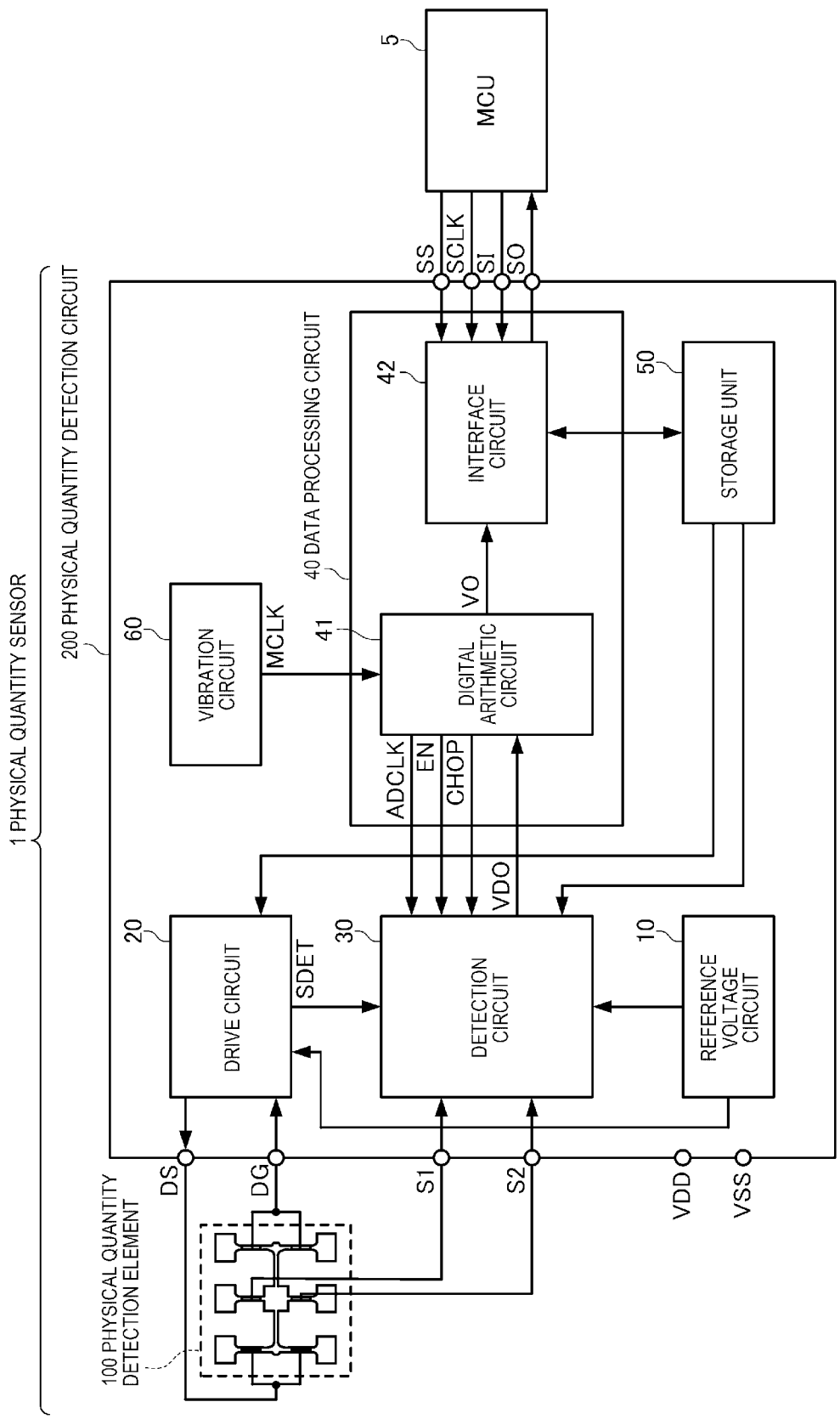
FIG. 1 is a diagram illustrating a configuration example of a physical quantity sensor of the present embodiment.

FIG. 1 is a functional block diagram of a physical quantity sensor of the present embodiment. A physical quantity sensor 1 of the present embodiment includes a physical quantity detection element 100 that outputs an analog signal related to the physical quantity and a physical quantity detection circuit 200.

The physical quantity detection element 100 includes a vibrator element in which a drive electrode and a detection electrode are arranged, and, in general, the vibrator element is sealed in a package in which airtightness is ensured in order to reduce the impedance of the vibrator element as much as possible and increase vibration efficiency. In the present embodiment, the physical quantity detection element 100 has a so-called double T-type vibrator element having two T-type drive vibration arms.

Figure 2:
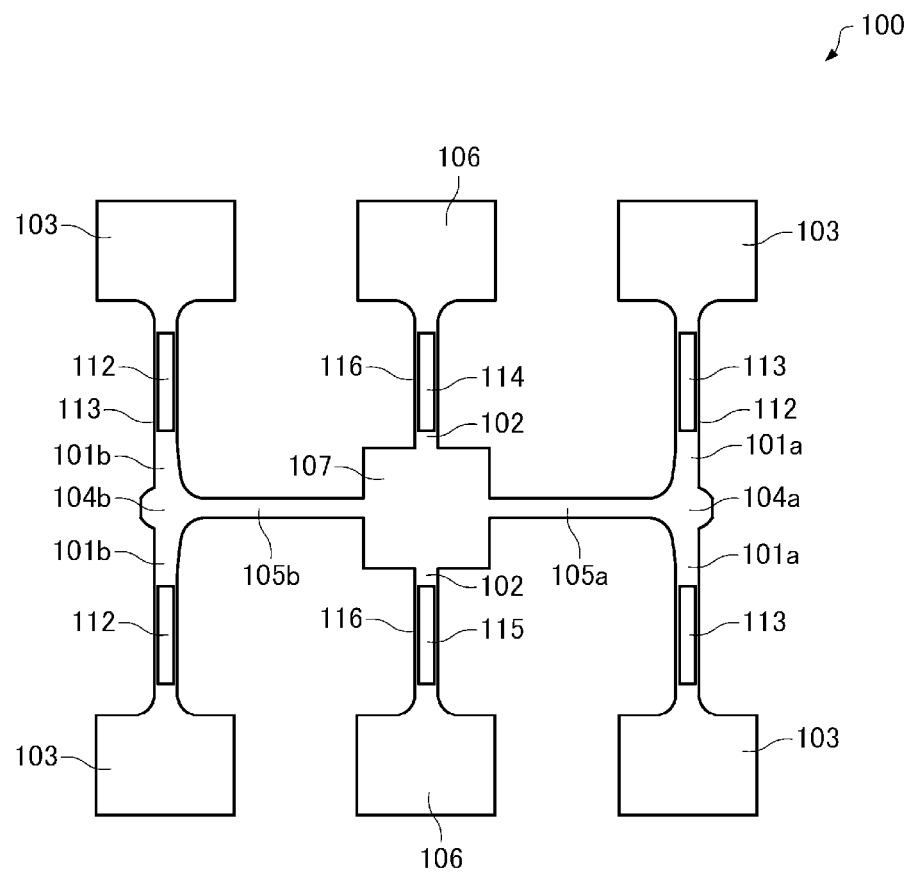
FIG. 2 is a plan view of a vibrator element of a physical quantity detection element.

FIG. 2 is a plan view of the vibrator element in the physical quantity detection element 100 of the present embodiment. For example, the physical quantity detection element 100 includes the double T-type vibrator formed of a Z-cut quartz crystal substrate. The vibrator element made of quartz crystal is advantageous in that the detection accuracy of the angular velocity can be increased because the variation of the resonance frequency with respect to the temperature change is extremely small. An X axis, a Y axis, and a Z axis in FIG. 2 illustrate axes of the quartz crystal.

As illustrated in FIG. 2, in the vibrator element of the physical quantity detection element 100, drive vibration arms 101a and 101b extend from two drive bases 104a and 104b in a +Y axis direction and a −Y axis direction, respectively. The drive electrodes 112 and 113 are formed on the side surface and the upper surface of the drive vibration arm 101a, and the drive electrodes 113 and 112 are formed on the side surface and the upper surface of the drive vibration arm 101b, respectively. The drive electrodes 112 and 113 are coupled with a drive circuit 20 via a DS terminal and a DG terminal of the physical quantity detection circuit 200 illustrated in FIG. 1, respectively.

The drive bases 104a and 104b are coupled with a rectangular detection base 107 via connection arms 105a and 105b extending toward a −X axis direction and a +X axis direction, respectively.

A detection vibration arm 102 extends from the detection base 107 in a +Y axis direction and a −Y axis direction. The detection electrodes 114 and 115 are formed on the upper surface of the detection vibration arm 102, and a common electrode 116 is formed on the side surface of the detection vibration arm 102. The detection electrodes 114 and 115 are coupled with a detection circuit 30 via an S1 terminal and an S2 terminal of the physical quantity detection circuit 200 illustrated in FIG. 1, respectively. In addition, the common electrode 116 is grounded.

Figure 3:
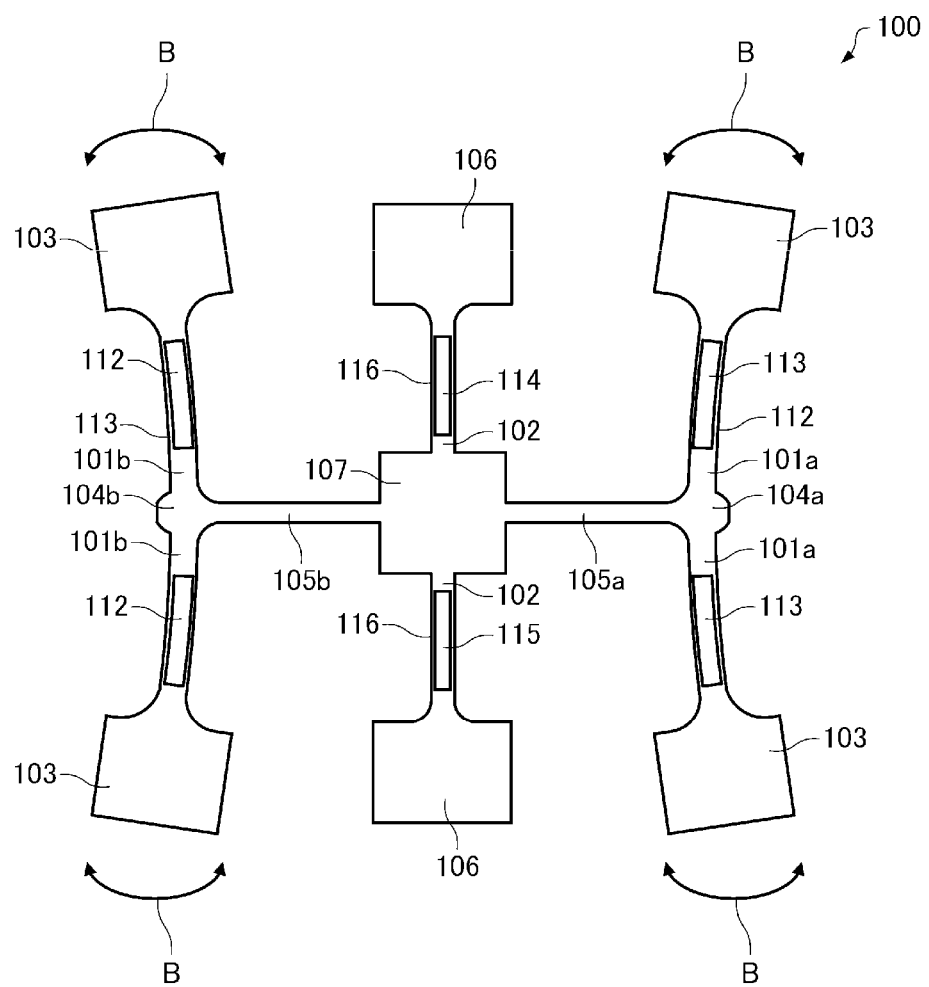
FIG. 3 is a diagram for explaining an operation of the physical quantity detection element.

When an AC voltage as a drive signal is applied between the drive electrode 112 and the drive electrode 113 of the drive vibration arms 101a and 101b, as illustrated in FIG. 3, the flexural vibration that tips of the two drive vibration arms 101a and 101b are repeatedly approached and separated from each other due to reverse piezoelectric effect as arrows B, is performed in the drive vibration arms 101a and 101b. Hereinafter, flexural vibration in the drive vibration arms 101a and 101b may be referred to as "excitation vibration".

Figure 4:
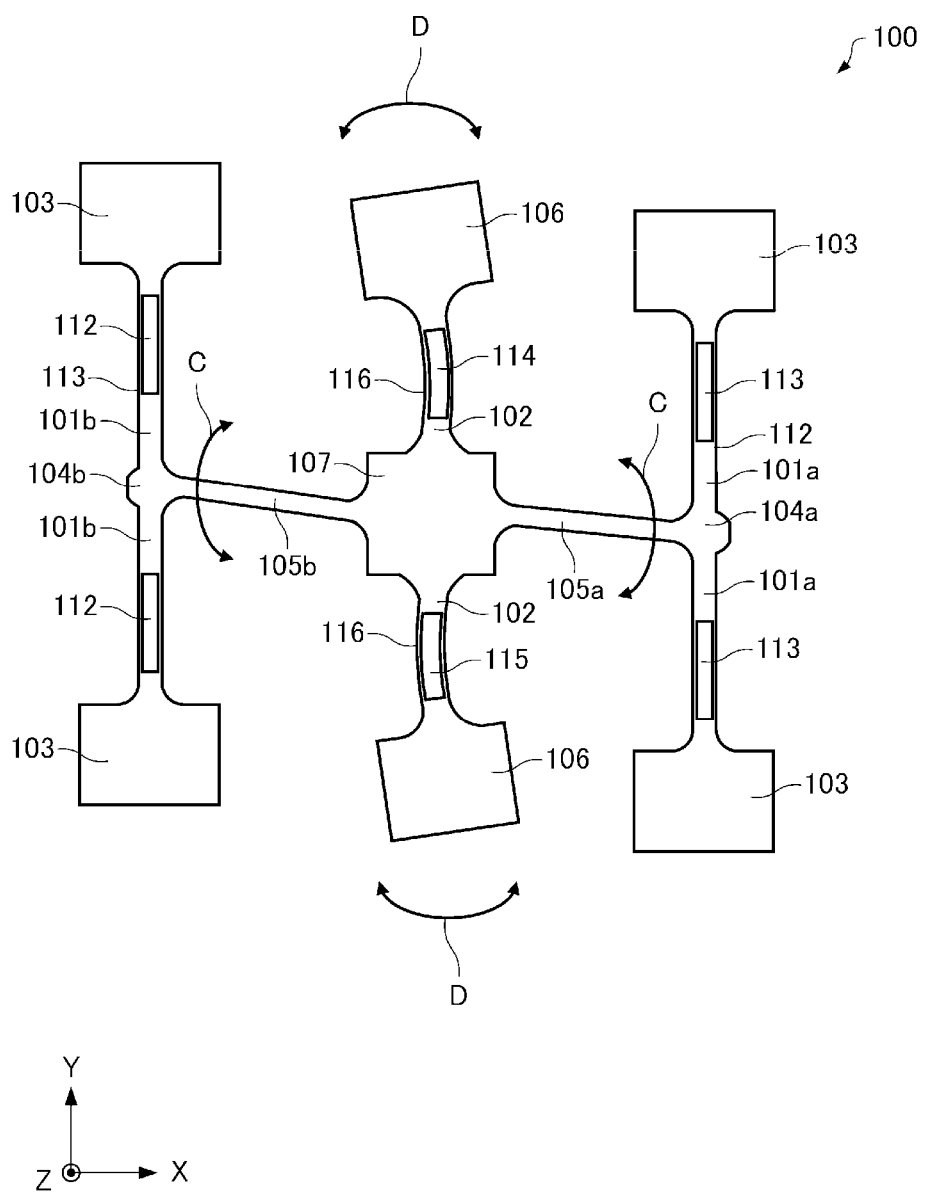
FIG. 4 is another diagram for explaining an operation of the physical quantity detection element.

In this state, when the angular velocity with the Z axis as a rotation axis is applied to the vibrator element of the physical quantity detection element 100, the drive vibration arms 101a and 101b obtain a Coriolis force in a direction perpendicular to both the directions of the flexural vibration of the arrow B and the Z axis. As a result, as illustrated in FIG. 4, the connection arms 105a and 105b vibrate as illustrated in arrows C. In the detection vibration arm 102, the flexural vibration is performed as illustrated arrows D in conjunction with the vibration of the connection arms 105a and 105b. The phase of the flexural vibration of the detection vibration arm 102 is shifted by 90° from the phase of the flexural vibration of the driving vibration arms 101a and 101b due to the Coriolis force.

However, if the magnitude of vibration energy or the amplitude of the vibration when the flexural vibration is performed in the drive vibration arms 101a and 101b is equal between the two drive vibration arms 101a and 101b, the vibration energy of the drive vibration arms 101a and 101b is balanced, and the detection vibration arm 102 does not flex and vibrate in a state where no angular velocity is applied to the physical quantity detection element 100. However, if the balance of the vibration energy of the two drive vibration arms 101a and 101b is lost, the flexural vibration is generated in the detection vibration arm 102 even when no angular velocity is applied to the physical quantity detection element 100. This flexural vibration is called as leakage vibration, and is the flexural vibration of the arrow D similar to the vibration based on the Coriolis force, but is in phase with the drive signal.

AC charge based on these flexural vibrations are generated in the detection electrodes 114 and 115 of the detection vibration arm 102 by the piezoelectric effect. Here, the AC charge generated based on the Coriolis force changes in accordance with the magnitude of the Coriolis force, that is, the magnitude of the angular velocity applied to the physical quantity detection element 100. On the other hand, the AC charge generated based on the leakage vibration is constant regardless of the magnitude of the angular velocity applied to the physical quantity detection element 100.

A rectangular weight portion 103 having a width wider than that of the drive vibration arms 101a and 101b is formed at the tips of the drive vibration arms 101a and 101b. By forming the weight portion 103 at the tips of the drive vibration arms 101a and 101b, it is possible to increase the Coriolis force and it is possible to obtain a desired resonance frequency in a relatively short vibration arm. Similarly, a weight portion 106 having a width wider than that of the detection vibration arm 102 is formed at a tip of the detection vibration arm 102. By forming the weight portion 106 at the tip of the detection vibration arm 102, it is possible to increase the AC charge generated in the detection electrodes 114 and 115.

As described above, the physical quantity detection element 100 outputs the AC charge based on the Coriolis force with the Z axis as the detection axis and the AC charge based on the leakage vibration of the excitation vibration via the detection electrodes 114 and 115. The physical quantity detection element 100 functions as an inertial sensor that detects the angular velocity. Hereinafter, the AC charge based on the Coriolis force may be referred to as an "angular velocity component" and the AC charge based on the leakage vibration force may be referred to as an "vibration leakage component".

Returning to the description of FIG. 1, the physical quantity detection circuit 200 includes a reference voltage circuit 10, the drive circuit 20, the detection circuit 30, a data processing circuit 40, a storage unit 50, and a vibration circuit 60. For example, the physical quantity detection circuit 200 may be realized as a one-chip integrated circuit (IC: Integrated Circuit). The physical quantity detection circuit 200 may have a configuration in which some of these elements are omitted or changed, or other elements are added.

The reference voltage circuit 10 generates a constant voltage or a constant current such as a reference voltage that is an analog ground voltage based on a power supply voltage vdd and a ground voltage gnd supplied from a VDD terminal and a VSS terminal of the physical quantity detection circuit 200, respectively, and supplies the generated current or voltage to the drive circuit 20 and the detection circuit 30.

The drive circuit 20 generates a drive signal for the excitation vibration of the physical quantity detection element 100, and supplies the generated signal to the drive electrode 112 of the physical quantity detection element 100 via the DS terminal. In addition, the drive circuit 20 receives a vibration current generated in the drive electrode 113 due to the excitation vibration of the physical quantity detection element 100 via the DG terminal, and performs feedback control of an amplitude level of the drive signal so as to maintain constant the amplitude width of the vibration current. In addition, the drive circuit 20 generates a detection signal SDET having the same phase as that of the drive signal, and outputs the generated signal to the detection circuit 30.

The detection circuit 30 receives the AC charge generated in two detection electrodes 114 and 115 of the physical quantity detection element 100 via the S1 terminal and the S2 terminal of the physical quantity detection circuit 200, respectively, detects the angular velocity component included in these AC charge by using the detection signal SDET, and generates and outputs a digital signal VDO having a digital value corresponding to the magnitude of the angular velocity component.

The storage unit 50 includes a non-volatile memory (not illustrated), and the non-volatile memory stores various trimming data for the drive circuit 20 and the detection circuit 30, for example, adjustment data and correction data. For example, the non-volatile memory may be configured as a MONOS (Metal Oxide Nitride Oxide Silicon) type memory or EEPROM (Electrically Erasable Programmable Read-Only Memory). Furthermore, the storage unit 50 may have a register (not illustrated), and may be configured so that various trimming data stored in the non-volatile memory are transferred to and held in the register when the physical quantity detection circuit 200 is turned on, that is, when a voltage at the VDD terminal rises from 0 V to a desired voltage, and the various trimming data held in the register are supplied to the drive circuit 20 or the detection circuit 30.

The data processing circuit 40 includes a digital arithmetic circuit 41 and the interface circuit 42. The digital arithmetic circuit 41 is operated by a master clock signal MCLK. Specifically, the digital arithmetic circuit 41 generates a clock signal ADCLK, an enable signal EN, and a chopping signal CHOP, and outputs the generated signals to the detection circuit 30. In addition, the digital arithmetic circuit 41 performs predetermined arithmetic processing on the digital signal VDO output from the detection circuit 30, and outputs digital data VO obtained by the arithmetic processing.

The interface circuit 42 performs processing of reading data stored in the non-volatile memory or the register of the storage unit 50 in response to a request from an MCU (Micro Control Unit) 5 that is an external device of the physical quantity detection circuit 200 and outputting the data to the MCU 5, and processing of writing data input from the MCU 5 to the non-volatile memory or the register of the storage unit 50, or the like. For example, the interface circuit 42 is an interface circuit of an SPI (Serial Peripheral Interface) bus, receives a selection signal, a clock signal, and a data signal transmitted from the MCU 5 via an SS terminal, an SCLK terminal, and an SI terminal of the physical quantity detection circuit 200, respectively, and outputs the data signal to the MCU 5 via an SO terminal of the physical quantity detection circuit 200. For example, the interface circuit 42 may be an interface circuit corresponding to various buses other than the SPI bus such as an I²C (Inter-Integrated Circuit) bus.

The vibration circuit 60 generates the master clock signal MCLK, and outputs the master clock signal MCLK to the digital arithmetic circuit 41. For example, the vibration circuit 60 may be configured as a ring oscillator or a CR vibration circuit.

1-2. Configuration of Drive Circuit

Figure 5:
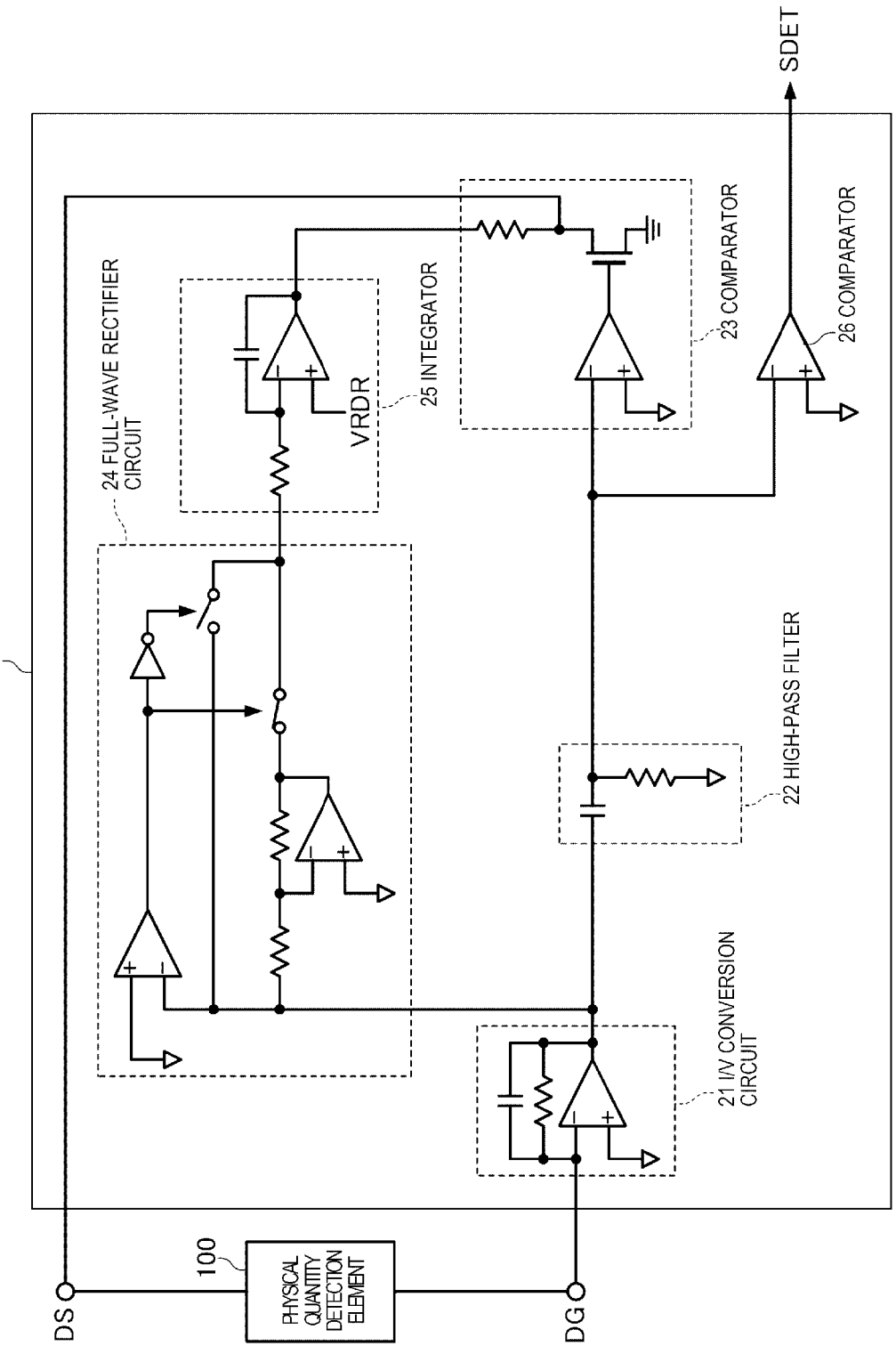
FIG. 5 is a diagram illustrating a configuration example of a drive circuit.

Next, the drive circuit 20 will be described. FIG. 5 is a diagram illustrating a configuration example of the drive circuit 20. As illustrated in FIG. 5, the drive circuit 20 of the present embodiment includes an I/V conversion circuit 21, a high-pass filter 22, a comparator 23, a full-wave rectifier circuit 24, an integrator 25, and a comparator 26. The drive circuit 20 of the present embodiment may have a configuration in which some of these elements are omitted or changed, or other elements are added.

The I/V conversion circuit 21 converts the vibration current generated by the excitation vibration of the physical quantity detection element 100 and received via the DG terminal into an AC voltage signal.

The high-pass filter 22 removes an offset of an output signal of the I/V conversion circuit 21.

The comparator 23 compares a voltage of an output signal of the high-pass filter 22 with the reference voltage to generate a binarized signal. Therefore, when the binarized signal is at a high level, the comparator 23 makes an NMOS transistor conductive and outputs a low level, and when the binarized signal is at a low level, the comparator 23 makes the NMOS transistor non-conductive and outputs an output voltage of the integrator 25 pulled up via a resistor as the high level. An output signal of the comparator 23 as the drive signal is supplied to the physical quantity detection element 100 via the DS terminal. By matching the frequency of the drive signal with the resonance frequency of the physical quantity detection element 100, it is possible to vibrate stably the physical quantity detection element 100.

The full-wave rectifier circuit 24 outputs a DC signal obtained by performing full-wave rectification on an output signal of the I/V conversion circuit 21.

The integrator 25 integrates and outputs an output voltage of the full-wave rectifier circuit 24 based on a desired voltage VRDR supplied from the reference voltage circuit 10. An output voltage of the integrator 25 decreases as an output of the full-wave rectifier circuit 24 is high, that is, as an amplitude of the output signal of the I/V conversion circuit 21 increases. Accordingly, as vibration amplitude increases, a voltage of the high level of the drive signal that is the output signal of the comparator 23 decreases, and as the vibration amplitude decreases, the voltage of the high level of the drive signal increases. Therefore, automatic gain control (AGC: Auto Gain Control) is performed such that the vibration amplitude is maintained constant.

The comparator 26 generates a square wave voltage signal that is the binarized signal by amplifying a voltage of the output signal of the high-pass filter 22, and outputs the generated signal as the detection signal SDET.

1-3. Configuration of Detection Circuit

Figure 6:
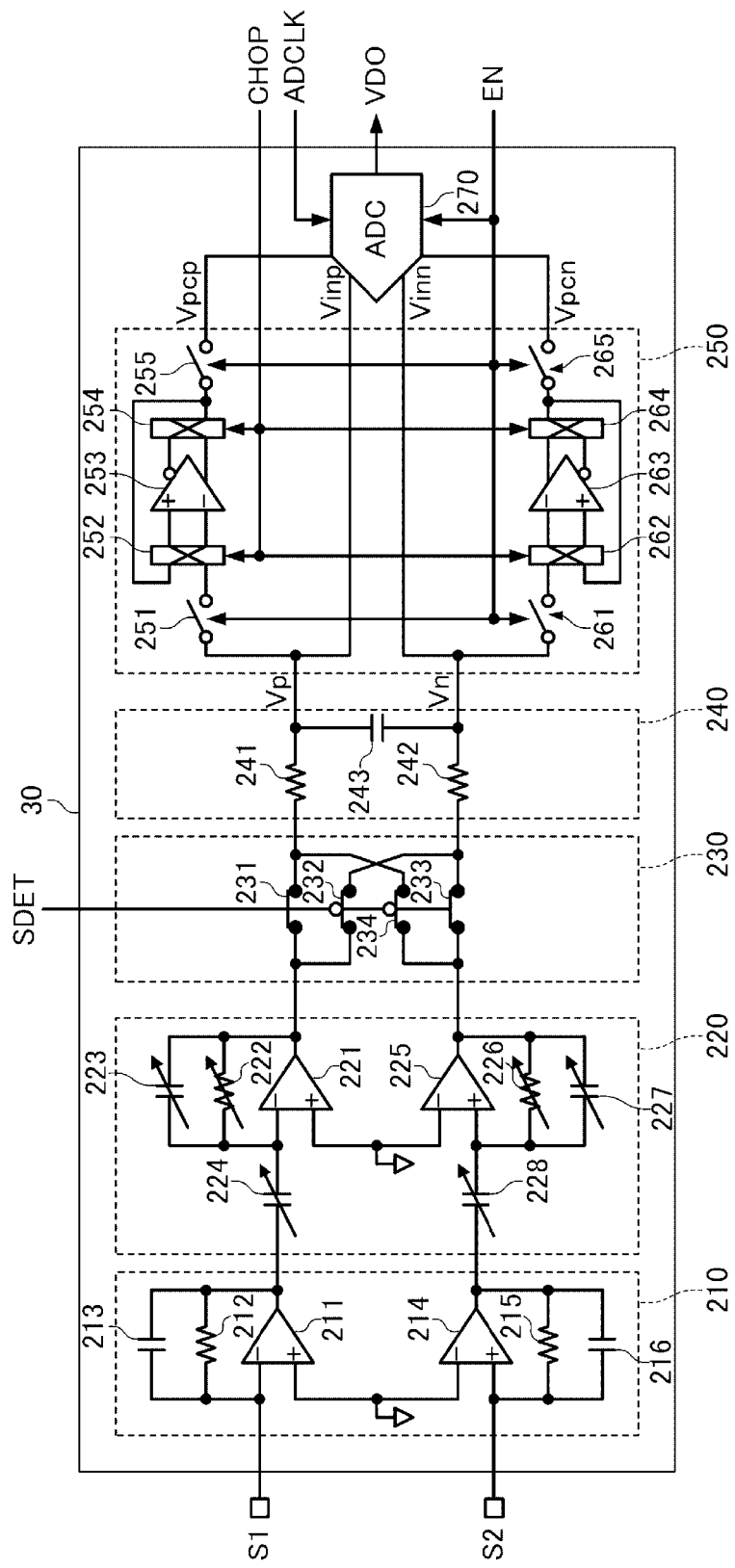
FIG. 6 is a diagram illustrating a configuration example of a detection circuit.

Next, the detection circuit 30 will be described. FIG. 6 is a diagram illustrating a configuration example of the detection circuit 30. As illustrated in FIG. 6, the detection circuit 30 of the present embodiment includes a Q-V conversion circuit 210, s variable gain amplifier 220, a mixer 230, a passive filter 240, a precharge circuit 250, and an analog/digital conversion circuit 270. The detection circuit 30 of the present embodiment may be configured such that some of these elements are omitted or changed, or other elements are added.

The Q-V conversion circuit 210 includes an operational amplifier 211, a resistor 212, a capacitor 213, an operational amplifier 214, a resistor 215, and a capacitor 216.

The AC charge including the angular velocity component and the vibration leakage component is input from the detection electrode 114 of the vibrator element of the physical quantity detection element 100 to an inverting input terminal of the operational amplifier 211 via the S1 terminal. The resistor 212 is a feedback resistor of the operational amplifier 211. In addition, the capacitor 213 is a feedback capacity of the operational amplifier 211. Similarly, AC charge including the angular velocity component and the vibration leakage component is input from the detection electrode 115 of the vibrator element of the physical quantity detection element 100 to a non-inverting input terminal of the operational amplifier 214 via the S2 terminal. The resistor 215 is the feedback resistor of the operational amplifier 214. In addition, the capacitor 216 is the feedback capacitor of the operational amplifier 214. The phase difference between the AC charge input to the operational amplifier 211 and the AC charge input to the operational amplifier 214 is 180°, and the phases of an output signal of the operational amplifier 211 and an output signal of the operational amplifier 214 are opposite to each other. The Q-V conversion circuit 210 configured as described above converts the AC charges input from each of the S1 terminal and the S2 terminal into voltage signals, and outputs differential signals having opposite phases to each other. That is, the Q-V conversion circuit 210 functions as a signal conversion circuit that converts an output signal of the physical quantity detection element 100 into voltages.

The variable gain amplifier 220 includes an operational amplifier 221, a resistor 222, a capacitor 223, a capacitor 224, an operational amplifier 225, a resistor 226, a capacitor 227, and a capacitor 228. The resistors 222 and 226 have variable resistance values, and the capacitors 223, 224, 227, and 228 have variable capacitance values.

A signal output from the operational amplifier 211 is input to the operational amplifier 221 via the capacitor 224. The resistor 222 is the feedback resistor of the operational amplifier 221. In addition, the capacitor 223 is the feedback capacity of the operational amplifier 221. Similarly, a signal output from the operational amplifier 214 is input to the operational amplifier 225 via the capacitor 228. The resistor 226 is the feedback resistor of the operational amplifier 225. In addition, the capacitor 227 is the feedback capacity of the operational amplifier 225. The variable gain amplifier 220 configured as described above amplifies a differential signal output from the Q-V conversion circuit 210, and outputs a differential signal having a desired voltage level.

The mixer 230 includes a switch 231, a switch 232, a switch 233, and a switch 234.

The switches 231 and 233 are turned on when the detection signal SDET output from the drive circuit 20 is at the high level, and turned off when it is at the low level. In addition, the switches 232 and 234 are turned on when the detection signal SDET is at the low level, and turned off when it is at the high level. The mixer 230 outputs the differential signal output from the variable gain amplifier 220 as it is when the detection signal SDET is at the high level, and outputs a signal in which the sign of the differential signal output from the variable gain amplifier 220 is switched when the detection signal SDET is at the low level. The mixer 230 configured as described above functions as a detection circuit that outputs the differential signal including the angular velocity component by detecting the differential signal output from the variable gain amplifier 220, by using the detection signal SDET. The differential signal output from the mixer 230 is a signal of a voltage level corresponding to the angular velocity applied to the physical quantity detection element 100. The differential signal output from the mixer 230 is an example of "a first analog signal based on an output signal of the physical quantity detection element". In addition, the differential signal output from the variable gain amplifier 220 is an example of "a third analog signal based on an output signal of the signal conversion circuit".

The passive filter 240 includes a resistor 241, a resistor 242, and a capacitor 243. An end of the resistor 241 and an end of the capacitor 243 are coupled with each other, an end of the resistor 242 and the other end of the capacitor 243 are coupled with each other, and the differential signal output from the mixer 230 is input to the other end of the resistor 241 and the other end of the resistor 242. The passive filter 240 configured as described above functions as a low-pass filter that outputs differential signals Vp and Vn obtained by attenuating high-frequency noise for the differential signal output from the mixer 230. In addition, the passive filter 240 also functions as an anti-aliasing filter for the analog/digital conversion circuit 270. Since the passive filter 240 does not include an active element such as a transistor that generates 1/f noise and an output noise is smaller than that of an active filter configured by using the active element, it is possible to improve the S/N ratio of an output signal of the physical quantity sensor 1. Depending on the application of the physical quantity sensor 1, the passive filter 240 may be a band-pass filter.

The analog/digital conversion circuit 270 is operated based on the clock signal ADCLK and the enable signal EN, samples input signals Vinp and Vinn at an input capacitance (not illustrated), and converts the sampled signals into digital signals. The input signals Vinp and Vinn are examples of a "second analog signal based on an output signal of the passive filter", and, in the example of FIG. 6, the differential signals Vp and Vn output from the passive filter 240.

The precharge circuit 250 includes a switch 251, a chopper circuit 252, an operational amplifier 253, a chopper circuit 254, a switch 255, a switch 261, a chopper circuit 262, an operational amplifier 263, a chopper circuit 264, and a switch 265.

The switches 251, 255, 261, and 265 are turned on when the enable signal EN is at the high level, and turned off when the enable signal EN is at the low level.

The chopper circuit 252 is provided in a signal path between the passive filter 240 and the operational amplifier 253. When the enable signal EN is at the high level, one signal Vp of the differential signals Vp and Vn output from the passive filter 240 is input to a first input terminal of the chopper circuit 252, via the switch 251. A signal output from an output terminal of the chopper circuit 254 is input to a second input terminal of the chopper circuit 252. Therefore, the chopper circuit 252 outputs one of two signals input to the first input terminal and the second input terminal from a first output terminal, and outputs the other from a second output terminal, based on the chopping signal CHOP.

The chopper circuit 262 is provided in a signal path between the passive filter 240 and the operational amplifier 263. When the enable signal EN is at the high level, the other signal Vn of the differential signals Vp and Vn output from the passive filter 240 is input to the first input terminal of the chopper circuit 262, via the switch 261. A signal output from an output terminal of the chopper circuit 264 is input to a second input terminal of the chopper circuit 262. Therefore, the chopper circuit 262 outputs one of two signals input to the first input terminal and the second input terminal from the first output terminal, and outputs the other from the second output terminal, based on the chopping signal CHOP.

In the present embodiment, the chopper circuits 252 and 262 output a signal input to the first input terminal from the first output terminal and output a signal input to the second input terminal from the second output terminal, when the chopping signal CHOP is at the low level. In addition, the chopper circuits 252 and 262 output the signal input to the first input terminal from the second output terminal and output the signal input to the second input terminal from the first output terminal, when the chopping signal CHOP is at the high level.

Signals output from the first output terminal and the second output terminal of the chopper circuit 252 are input to the inverting input terminal and the non-inverting input terminal of the operational amplifier 253, respectively. In addition, signals output from the first output terminal and the second output terminal of the chopper circuit 262 are input to the inverting input terminal and the non-inverting input terminal of the operational amplifier 263, respectively.

The chopper circuit 254 is provided in a signal path between the operational amplifier 253 and the analog/digital conversion circuit 270. A signal output from the non-inverting output terminal of the operational amplifier 253 is input to the first input terminal of the chopper circuit 254. A signal output from the inverting output terminal of the operational amplifier 253 is input to the second input terminal of the chopper circuit 254. Therefore, the chopper circuit 254 outputs one of two signals input to the first input terminal and the second input terminal from the first output terminal, and outputs the other from the second output terminal, based on the chopping signal CHOP. When the enable signal EN is at the high level, a signal, as a precharge signal Vpcp, output from the first output terminal of the chopper circuit 254, is output to the analog/digital conversion circuit 270, via the switch 255.

The chopper circuit 264 is provided in a signal path between the operational amplifier 263 and the analog/digital conversion circuit 270. A signal output from the non-inverting output terminal of the operational amplifier 263 is input to a first input terminal of the chopper circuit 264. A signal output from the inverting output terminal of the operational amplifier 263 is input to a second input terminal of the chopper circuit 264. Therefore, the chopper circuit 264 outputs one of two signals input to the first input terminal and the second input terminal from the first output terminal, and outputs the other from the second output terminal based on the chopping signal CHOP. When the enable signal EN is at the high level, a signal, as a precharge signal Vpcn, output from the first output terminal of the chopper circuit 264 is output to the analog/digital conversion circuit 270 via the switch 265.

In the present embodiment, the chopper circuits 254 and 264 output the signal input to the first input terminal from the second output terminal, and output the signal input to the second input terminal from the first output terminal, when the chopping signal CHOP is at the low level. In addition, the chopper circuits 254 and 264 output the signal input to the first input terminal from the first output terminal, and output the signal input to the second input terminal from the second output terminal, when the chopping signal CHOP is at the high level.

By periodically repeating the level of the chopping signal CHOP between the low level and the high level, each of the chopper circuits 252, 254, 262, and 264 performs a chopping operation that alternately repeats a first state in which the signal input to the first input terminal is output from the second output terminal and the signal input to the second input terminal is output from the first output terminal and, and a second state in which the signal input to the first input terminal is output from the first output terminal and the signal input to the second input terminal is output from the second output terminal. By the chopping operation of the chopper circuits 252 and 254, the precharge signal Vpcp in which the 1/f noise of an output signal of the operational amplifier 253 is effectively reduced, is obtained. Similarly, by the chopping operation of the chopper circuits 262 and 264, the precharge signal Vpcn in which the 1/f noise of an output signal of the operational amplifier 263 is effectively reduced, is obtained.

The precharge circuit 250 configured as described above is provided at a signal path between the passive filter 240 and the analog/digital conversion circuit 270, and precharges an input capacitance of the analog/digital conversion circuit 270, by the precharge signals Vpcp and Vpcn corresponding to a voltage level of the differential signal output from the passive filter 240, before the analog/digital conversion circuit 270 samples the input signals Vinp and Vinn at the input capacitance.

The chopper circuit 252 and the chopper circuit 254 are examples of a "first chopper circuit" and a "second chopper circuit", respectively. In addition, the chopper circuit 262 and the chopper circuit 264 are other examples of the "first chopper circuit" and the "second chopper circuit".

1-4. Configuration of Analog/Digital Conversion Circuit

Figure 7:
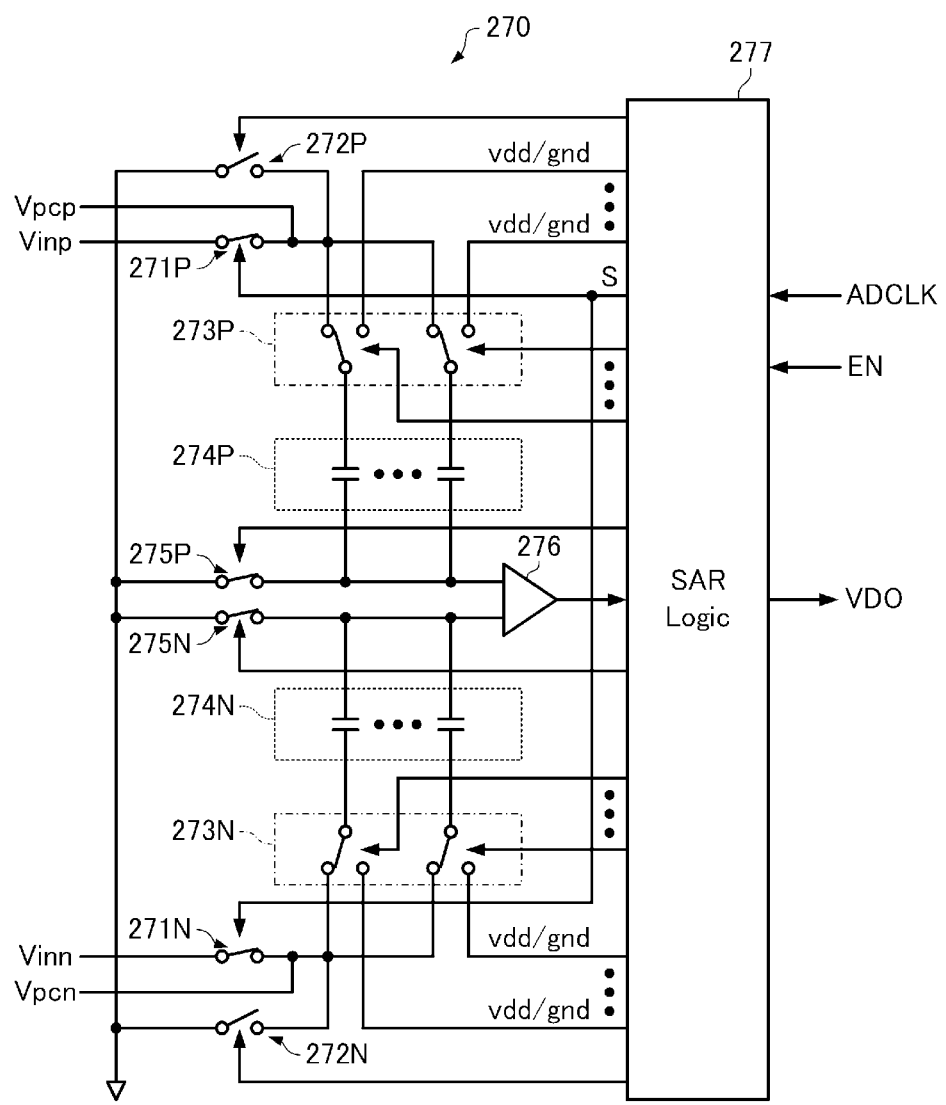
FIG. 7 is a diagram illustrating a configuration example of an analog/digital conversion circuit.

Next, the analog/digital conversion circuit 270 will be described. In the present embodiment, the analog/digital conversion circuit 270 is a successive approximation type analog/digital conversion circuit. FIG. 7 is a diagram illustrating of a configuration example of the analog/digital conversion circuit 270. As illustrated in FIG. 7, the analog/digital conversion circuit 270 of the present embodiment includes a switch 271P, a switch 271N, a switch 272P, a switch 272N, a switch array 273P, a switch array 273N, a capacitor array 274P, a capacitor array 274N, a switch 275P, a switch 275N, a comparator 276, and a logic circuit 277. The analog/digital conversion circuit 270 of the present embodiment may have a configuration in which some of these elements are omitted or changed, or other elements are added.

Each of the capacitor arrays 274P and 274N has a plurality of capacitors having different capacitance values, and functions as the input capacitance of the analog/digital conversion circuit 270.

The logic circuit 277 controls operations of the switches 271P, 271N, 272P, 272N, 275P, and 275N, and the switch arrays 273P and 273N, based on the clock signal ADCLK and the enable signal EN.

Specifically, the logic circuit 277 controls the switches 271P and 271N to be turned off by setting a switch control signal S to the low level, controls the switches 272P and 272N to be turned off, and controls the switches 275P and 275N to be turned on, when the enable signal EN is at the high level. Furthermore, the logic circuit 277 controls operations of the switch arrays 273P and 273N such that the individual capacitors of the capacitor arrays 274P and 274N are precharged by the precharge signals Vpcp and Vpcn.

Next, when the enable signal EN is changed from the high level to the low level, the logic circuit 277 controls the switches 271P and 271N to be turned on by changing the switch control signal S from the low level to the high level, and samples the input signals Vinp and Vinn at the individual capacitors of the capacitor arrays 274P and 274N.

Next, when a predetermined time required for sampling elapses while the switch control signal S is changed from the low level to the high level, the logic circuit 277 controls the switches 271P and 271N to be turned off, controls the switches 272P and 272N to be turned on, and controls the switches 275P and 275N to be turned off by changing the switch control signal S from the high level to the low level. Furthermore, the logic circuit 277 controls operations of the switch arrays 273P and 273N such that each capacitor of the capacitor arrays 274P and 274N is coupled with the logic circuit 277. Therefore, the logic circuit 277 repeats N times an operation that the power supply voltage vdd or the ground voltage gnd is applied to each capacitor of the capacitor arrays 274P and 274N, according to whether the binarized signal output from the comparator 276 is at the high level or the low level. The logic circuit 277 parallel-converts a binary signal output from the comparator 276 and generates an N-bit digital signal VDO having a digital value corresponding to the difference between the voltage of the input signal Vinp and the voltage of the input signal Vinn.

As described above, a period in which the enable signal EN is at the high level corresponds to a precharge period, a period in which the switch control signal S is at the high level corresponds to a sampling period, and a period in which the switch control signal S and the enable signal EN are at the low level corresponds to a conversion period.

1-5. Operation Method of Physical Quantity Detection Circuit

An operation method of the physical quantity detection circuit 200 of the present embodiment includes a precharge step of precharging the input capacitance of the analog/digital conversion circuit 270 by the precharge circuit 250, based on output signals of the operational amplifiers 253 and 263, a sampling step of sampling the input signals Vinp and Vinn at the input capacitance by the analog/digital conversion circuit 270 after the precharge step, and the chopping step of performing a chopping operation by the chopper circuits 252, 254, 262, and 264 in synchronization with the sampling step. In addition, the operation method of the physical quantity detection circuit 200 of the present embodiment includes a converting step of converting the input signals Vinp and Vinn sampled in the input capacitance into the digital signal VDO after the sampling step.

Figure 8:
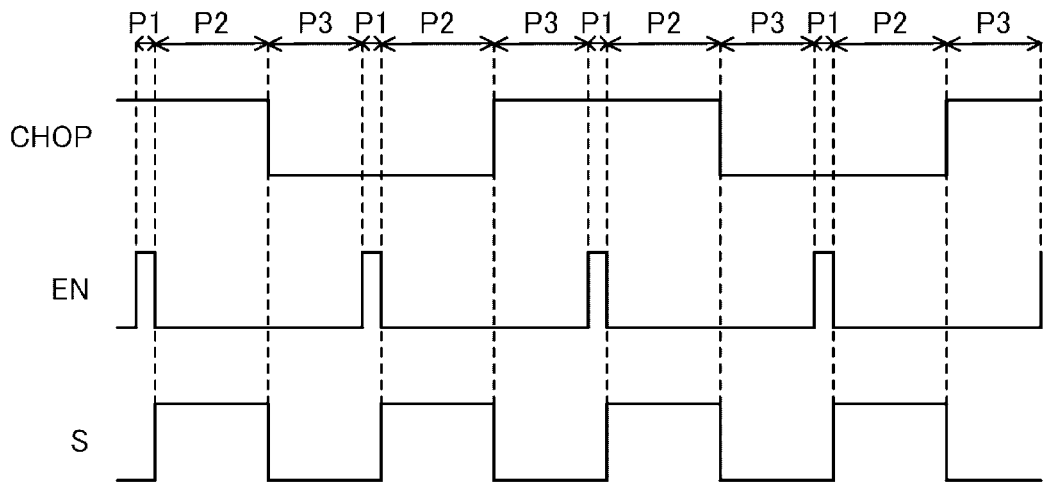
FIG. 8 is a diagram illustrating an example of a timing chart of a chopping signal, an enable signal, and a switch control signal.

FIG. 8 is a diagram illustrating an example of a timing chart of the chopping signal CHOP, the enable signal EN, and the switch control signal S for realizing the operation method of the physical quantity detection circuit 200 of the present embodiment. As illustrated in FIG. 8, in a period P1, the chopping signal CHOP is at the high level or the low level, the enable signal EN is at the high level, and the switch control signal S is at the low level. The period P1 is the precharge period, and the precharge step is performed during the period P1.

Figure 9:
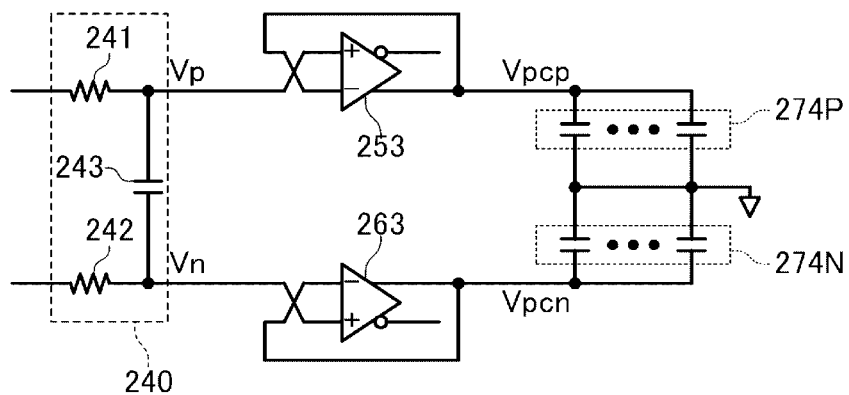
FIG. 9 is a diagram illustrating a connection state of a capacitor array when the chopping signal is at a high level in a period P1 of FIG. 8.
Figure 10:
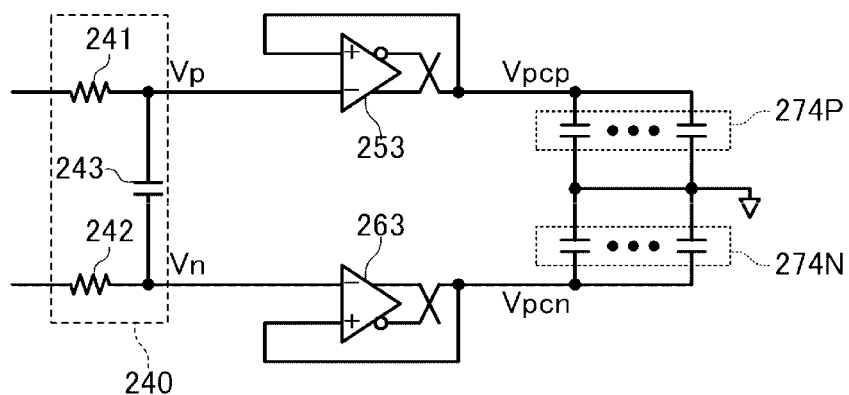
FIG. 10 is a diagram illustrating a connection state of the capacitor array when the chopping signal is at a low level in the period P1 of FIG. 8.

FIG. 9 is a diagram illustrating a connection state of the capacitor arrays 274P and 274N when the chopping signal CHOP is at the high level in the period P1. As illustrated in FIG. 9, in the period P1, when the chopping signal CHOP is at the high level, a signal Vp output from a passive filter is input to the non-inverting input terminal of the operational amplifier 253, and a signal, as the precharge signal Vpcp, output from the non-inverting output terminal of the operational amplifier 253 is supplied to one end of each capacitor of the capacitor array 274P. In addition, a signal Vn output from a passive filter is input to the non-inverting input terminal of the operational amplifier 263, and a signal, as the precharge signal Vpcn, output from the non-inverting output terminal of the operational amplifier 263 is supplied to one end of each capacitor of the capacitor array 274N. The reference voltage is supplied to the other end of each capacitor of the capacitor arrays 274P and 274N. In addition, FIG. 10 is a diagram illustrating a connection state of the capacitor arrays 274P and 274N when the chopping signal CHOP is at the low level in the period P1. As illustrated in FIG. 10, in the period P1, when the chopping signal CHOP is at the low level, the signal Vp output from a passive filter is input to the inverting input terminal of the operational amplifier 253, and a signal, as the precharge signal Vpcp, output from the inverting output terminal of the operational amplifier 253 is supplied to one end of each capacitor of the capacitor array 274P. In addition, the signal Vn output from a passive filter is input to the inverting input terminal of the operational amplifier 263, and a signal, as the precharge signal Vpcn, output from the inverting output terminal of the operational amplifier 263 is supplied to one end of each capacitor of the capacitor array 274N. The reference voltage is supplied to the other end of each capacitor of the capacitor arrays 274P and 274N.

Figure 11:
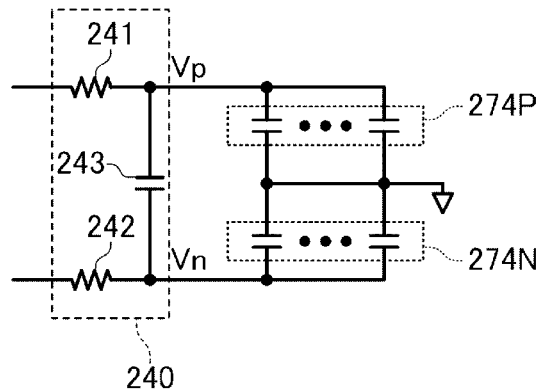
FIG. 11 is a diagram illustrating a connection state of the capacitor array in a period P2 of FIG. 8.

As illustrated in FIG. 8, in a period P2, the chopping signal CHOP is at the high level or the low level, the enable signal EN is at the low level, and the switch control signal S is at the high level. The period P2 is the sampling period, and the sampling step is performed in the period P2. FIG. 11 is a diagram illustrating a connection state of the capacitor arrays 274P and 274N in the period P2. As illustrated in FIG. 11, in the period P2, the signal Vp output from a passive filter is supplied to one end of each capacitor of the capacitor array 274P. In addition, the signal Vn output from a passive filter is supplied to one end of each capacitor of the capacitor array 274N. The reference voltage is supplied to the other end of each capacitor of the capacitor arrays 274P and 274N.

Figure 12:
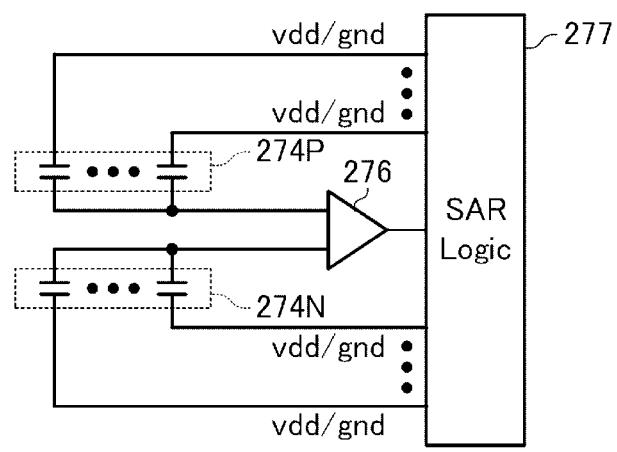
FIG. 12 is a diagram illustrating a connection state of the capacitor array in a period P3 of FIG. 8.

As illustrated in FIG. 8, in a period P3, the chopping signal CHOP is at the high level or the low level, the enable signal EN is at the low level, and the switch control signal S is at the low level. The period P3 is the conversion period, and the converting step is performed in the period P3. FIG. 12 is a diagram illustrating a connection state of the capacitor arrays 274P and 274N in the period P3. As illustrated in FIG. 12, in the period P3, the power supply voltage vdd or the ground voltage gnd is supplied from the logic circuit 277 to one end of each capacitor of the capacitor array 274P, and the other end of each capacitor of the capacitor array 274P is coupled with one input terminal of the comparator 276. In addition, the power supply voltage vdd or the ground voltage gnd is supplied from the logic circuit 277 to one end of each capacitor of the capacitor array 274N, and the other end of each capacitor of the capacitor array 274N is coupled with the other input terminal of the comparator 276.

The chopping step is performed in the periods P1, P2, and P3. Therefore, the precharge step and the chopping step are performed in parallel in the period P1, the sampling step and the chopping step are performed in parallel in the period P2, and the converting step and the chopping step are performed in parallel in the period P3.

In the FIG. 8, a timing for switching high/low of the chopping signal CHOP coincides with a timing at which the sampling period P2 ends, but it is not always necessary to be at this timing. The high/low of the chopping signal CHOP may be switched in the precharge period P1 adjacent in time series. That is, the first state and the second state of the chopper circuits 252, 254, 262, and 264 may be alternately repeated every time the precharge period P1 comes.

1-6. Effect

Figure 13:
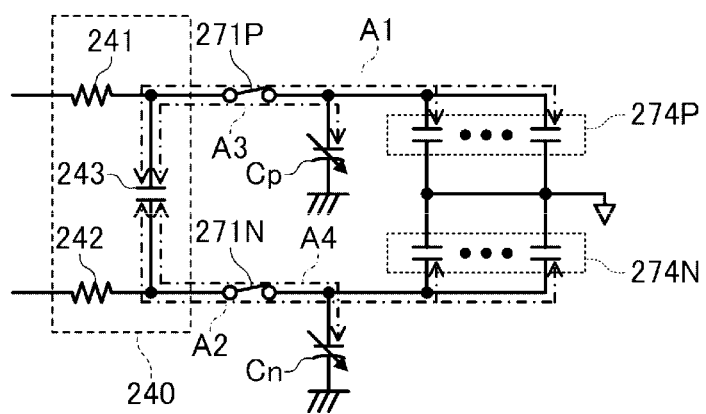
FIG. 13 is a diagram that a circuit diagram of FIG. 11 is described in detail.

In the physical quantity sensor 1 of the present embodiment described above, in the analog/digital conversion circuit 270, when the switches 271P and 271N are turned on to sample the input signals Vinp and Vinn, a circuit as illustrated in FIG. 13 is configured. FIG. 13 is a diagram in which a circuit diagram of FIG. 11 is described in more detail.

In FIG. 13, Cp and Cn are parasitic capacitors of the switch arrays 273P and 273N, respectively. For example, in a state where the sum of a charge amount stored in the capacitor arrays 274P and 274N and a charge amount stored in the parasitic capacitors Cp and Cn is different from a charge amount stored in the capacitor 243 of the passive filter 240, when the switches 271P and 271N are turned on, as illustrated in dash-dotted arrows A1, A2, A3, and A4 in FIG. 13, and charge transfer may occur between the capacitor arrays 274P and 274N, the parasitic capacitors Cp and Cn, and the capacitor 243, which may decrease a gain of the analog/digital conversion circuit 270. As described above, since the analog/digital conversion circuit 270 is a successive approximation type analog/digital conversion circuit and each of the capacitor arrays 274P and 274N has M capacitors, a value of the input capacitance thereof is large in comparison to that of other types of the analog/digital conversion circuit. Therefore, for example, when charges transfer between the capacitor arrays 274P and 274N, the parasitic capacitors Cp and Cn, and the capacitor 243, the amount of charge transfer increases and the gain of the analog/digital conversion circuit 270 significantly decreases. As a result, since the level of a digital signal output from the analog/digital conversion circuit 270 significantly decreases, the S/N ratio (Signal to Noise Ratio) decreases. For example, if the amount of decrease in the level of the digital signal is constant regardless of the level of the input signals Vinp and Vinn, the S/N ratio cannot be improved, but it is possible to correct the level of the digital signal in the digital arithmetic circuit 41 at the subsequent stage. However, in practice, since the amount of charge stored in the parasitic capacitors Cp and Cn immediately before the switches 271P and 271N are turned on, differs depending on a value of the digital signal, the amount of decrease in the level of the digital signal differs depending on the levels of the input signals Vinp and Vinn, and it is impossible to correct the level of the digital signal in the digital arithmetic circuit 41.

Therefore, in the physical quantity sensor 1 of the present embodiment, as described above, before the analog/digital conversion circuit 270 samples the input signals Vinp and Vinn at the input capacitance, the input capacitance of the analog/digital conversion circuit 270 is precharged by the precharge signals Vpcp and Vpcn corresponding to the voltage level of the differential signal output from the passive filter 240. As a result, in a state where the sum of the charge amount stored in the capacitor arrays 274P and 274N and the charge amount stored in the parasitic capacitors Cp and Cn, is substantially equal to the charge amount stored in the capacitor 243 of the passive filter 240, since the switches 271P and 271N are turned on, there is almost no charge transfer between the capacitor arrays 274P and 274N, the parasitic capacitors Cp and Cn, and the capacitor 243. Therefore, according to the physical quantity sensor 1 of the present embodiment, since it is possible to decrease the gain reduction of the analog/digital conversion circuit 270 and the reduction amount is constant, it is possible to correct the level of the digital signal in the digital arithmetic circuit 41.

However, when the noise level of the precharge signals Vpcp and Vpcn increases by 1/f noise generated by the MOS transistors included in the operational amplifiers 253 and 263 of the precharge circuit 250, the noise level of the input signals Vinp and Vinn of the analog/digital conversion circuit 270 also increases. On the contrary, in the physical quantity sensor 1 of the present embodiment, as described above, since the precharge signals Vpcp and Vpcn with 1/f noise effectively reduced are obtained by the chopping operation of the chopper circuits 252, 254, 262, and 264 included in the precharge circuit 250, it is possible to reduce the noise level of the input signals Vinp and Vinn of the analog/digital conversion circuit 270.

Furthermore, in the physical quantity sensor 1 of the present embodiment, in the detection circuit 30, since analog signal processing in the previous stage of the analog/digital conversion circuit 270 is performed by a differential signal, the increase of the noise level of the input signals Vinp and Vinn of the analog/digital conversion circuit 270 can be effectively suppressed without being affected by common-mode noise such as power supply noise.

As described above, according to the physical quantity sensor 1 of the present embodiment, since the decrease in the gain of the analog/digital conversion circuit 270 is small and the noise level of the input signals Vinp and Vinn of the analog/digital conversion circuit 270 is reduced, it is possible to output the digital signal having a high S/N ratio.

1-7. Modification Example

In the embodiments, although the input signal of the analog/digital conversion circuit 270 is the differential signal, it may be a single-ended signal. In this case, the differential signal output from the physical quantity detection element 100 is converted into the single-ended signal in either the Q-V conversion circuit 210, the variable gain amplifier 220, the mixer 230, or the passive filter 240 of the detection circuit 30. For example, the variable gain amplifier 220 may convert the differential signal output from the Q-V conversion circuit 210 into the single-ended signal, and the mixer 230, the passive filter 240, and the precharge circuit 250 may perform the above-described processing for the single-ended signal.

In addition, in the embodiments, as the physical quantity sensor 1, although the angular velocity sensor including the physical quantity detection element 100 that detects the angular velocity is described as an example, the physical quantity detected by the physical quantity detection element 100 is not limited to the angular velocity, and may be angular acceleration, acceleration, speed, force, or the like. In addition, the vibrator element of the physical quantity detection element 100 may not be a double T type, and may be, for example, a tuning fork type or a comb tooth type, or may be a sound piece type having a triangular prism shape, a quadrangular prism shape, a cylindrical shape, or the like. In addition, as the material of the vibrator element of the physical quantity detection element 100, instead of quartz crystal ($SiO_2$), for example, piezoelectric materials such as a piezoelectric single crystal such as lithium tantalate ($LiTaO_3$) and lithium niobate ($LiNbO_3$) or a piezoelectric ceramic such as lead zirconate titanate (PZT) may be used, and a silicon semiconductor may be used. In addition, for example, the vibrator element of the physical quantity detection element 100 may have a structure in which a piezoelectric thin film such as zinc oxide (ZnO) and aluminum nitride (AlN) interposed between drive electrodes is disposed on a part of the surface of a silicon semiconductor. In addition, the physical quantity detection element 100 is not limited to a piezoelectric element, but may be a vibration element such as an electrodynamic type, a capacitor type, an eddy current type, an optical type, and a strain gauge type. For example, the physical quantity detection element 100 may be a capacitor type MEMS (Micro Electro Mechanical Systems) vibrator. In addition, a detection method of the physical quantity detection element 100 is not limited to the vibration type, and may be, for example, an optical type, a rotary type, or a fluid type.

In addition, in the embodiments, as the physical quantity sensor 1, although the uniaxial sensor provided with one physical quantity detection element 100 is described as an example, the physical quantity sensor 1 may be a multi-axis sensor provided with a plurality of physical quantity detection elements 100. For example, the physical quantity sensor 1 may be a three-axis gyro sensor provided with three physical quantity detection elements that detect angular velocities around three different axes, or may be a composite sensor including a physical quantity detection element that detects the angular velocity and a physical quantity detection element that detects the acceleration.

2. Electronic Apparatus

Figure 14:
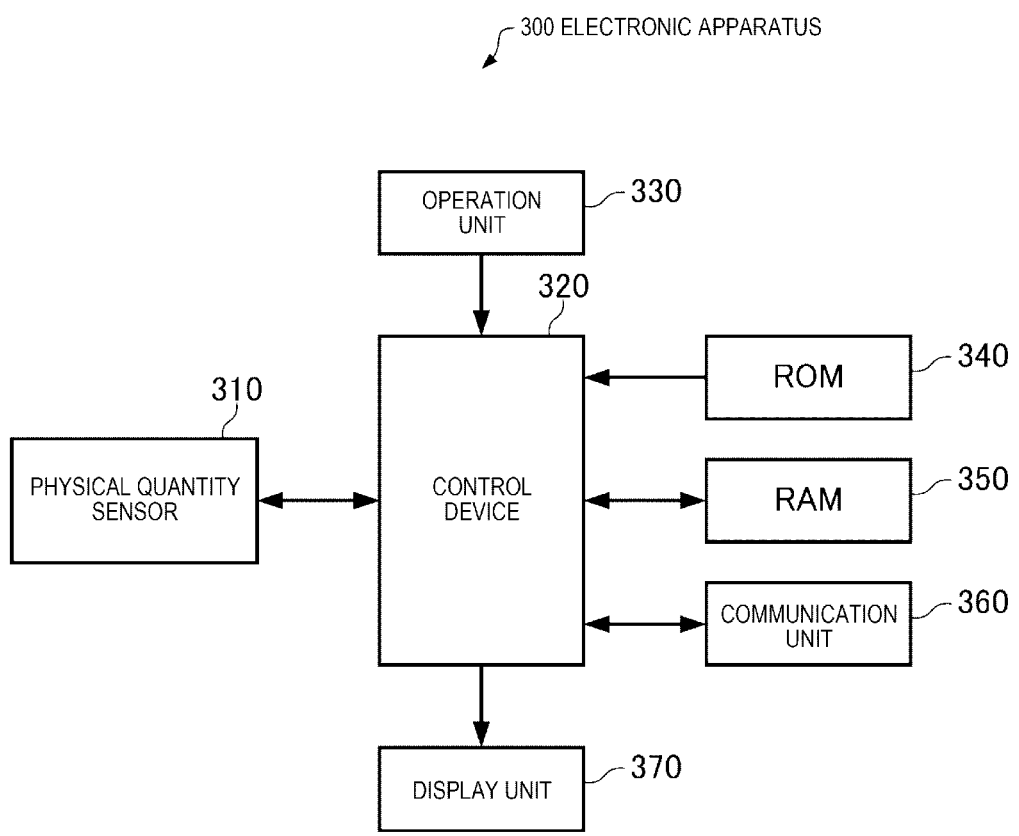
FIG. 14 is a functional block diagram illustrating a configuration example of an electronic apparatus of the present embodiment.

FIG. 14 is a functional block diagram illustrating a configuration example of an electronic apparatus of the present embodiment. As illustrated in FIG. 14, an electronic apparatus 300 of the present embodiment includes a physical quantity sensor 310, a control device 320, an operation unit 330, a ROM (Read Only Memory) 340, a RAM (Random Access Memory) 350, a communication unit 360, and a display unit 370. The electronic apparatus of the present embodiment may have a configuration in which some of the components in FIG. 14 are omitted or changed, or other components are added.

The physical quantity sensor 310 outputs a detection result obtained by detecting the physical quantity to the control device 320. For example, it is possible to apply the above-described physical quantity sensor 1 of the present embodiment as the physical quantity sensor 310.

The control device 320 communicates with the physical quantity sensor 310 in accordance with a program stored in the ROM 340 or the like, and performs various calculation processes and control processes by using output signals of the physical quantity sensor 310. In addition, the control device 320 performs various processes according to operation signals from the operation unit 330, processing for controlling the communication unit 360 to perform data communication with an external device, processing for transmitting a display signal to display various types of information on the display unit 370, and the like. For example, the control device 320 corresponds to the MCU 5 illustrated in FIG. 1.

The operation unit 330 is an input device configured with operation keys, button switches, and the like, and outputs an operation signal corresponding to an operation by a user to the control device 320.

The ROM 340 stores programs, data, and the like for the control device 320 to perform various calculation processes and control processes.

The RAM 350 is used as a work area of the control device 320, and temporarily stores programs and data read from the ROM 340, data input from the operation unit 330, calculation results performed by the control device 320 according to various programs, and the like.

The communication unit 360 performs various controls for establishing data communication between the control device 320 and the external device.

The display unit 370 is a display device configured with an LCD (Liquid Crystal Display) or the like, and displays various types of information based on display signals input from the control device 320. A touch panel that functions as the operation unit 330 may be provided in the display unit 370.

For example, as the physical quantity sensor 310, by applying the above-described physical quantity sensor 1 of the present embodiment, it is possible to realize, for example, a highly reliable electronic apparatus.

As such an electronic apparatus 300, various electronic apparatuses can be considered, for example, personal computers such as mobile type, laptop type, and tablet type, mobile terminals such as smartphones and mobile phones, ink jet cameras such as digital cameras and ink jet printers, storage area network equipment such as routers and switches, local area network equipment, vehicle terminal base station equipment, televisions, video cameras, video recorders, car navigation devices, real-time clock devices, pagers, electronic notebooks, electronic dictionaries, calculators, electronic game devices, game controller, word processor workstations, video phones, TV monitors for crime prevention, electronic binoculars, POS terminals, electronic thermometers, blood pressure monitors, blood glucose meters, electrocardiogram measuring devices, ultrasonic diagnostic devices, medical equipment such as electronic endoscopes, fish finders, various measuring devices, instruments such as vehicles, aircrafts, and ships, flight simulators, head-mounted displays, motion trace, motion tracking, motion controllers, pedestrian dead reckoning (PDR: Pedestrian Dead Reckoning) devices, and the like.

Figure 15:
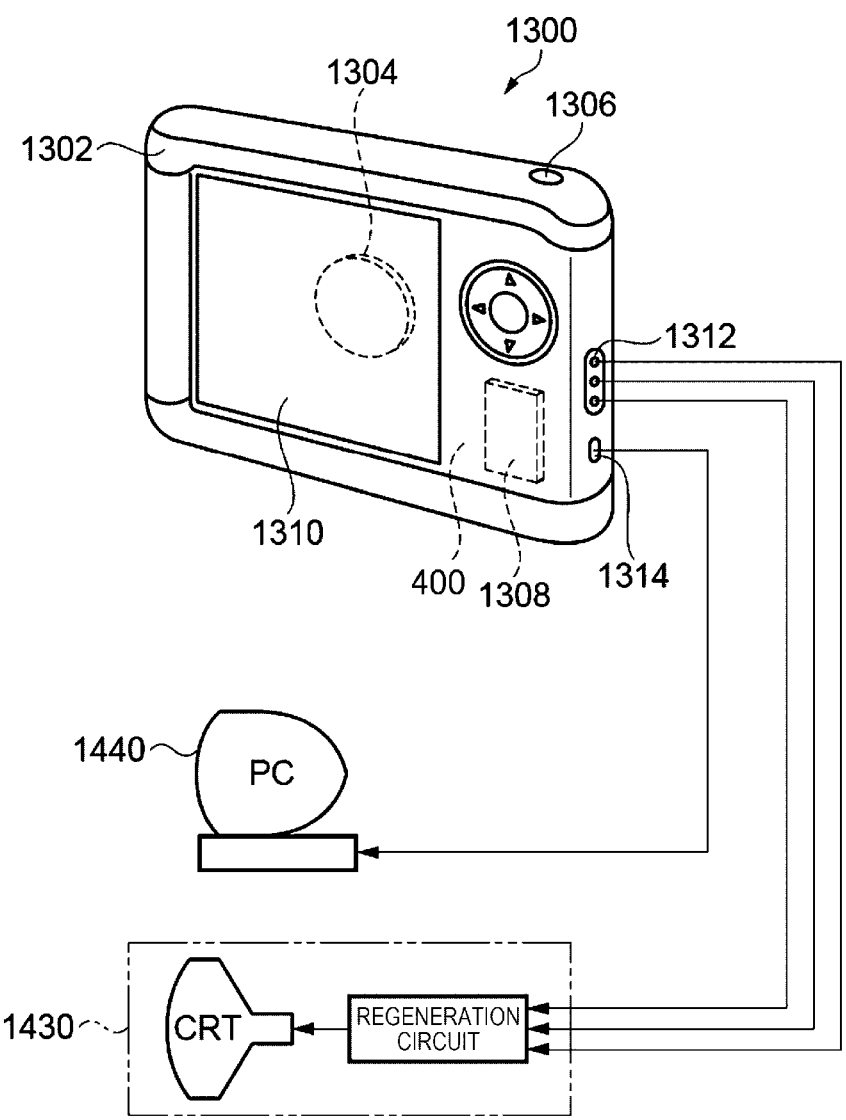
FIG. 15 is a perspective view illustrating schematically a digital camera which is an example of the electronic apparatus.

FIG. 15 is a perspective view illustrating schematically a digital camera 1300 that is an example of the electronic apparatus 300 of the present embodiment. FIG. 15 also illustrates a simple connection with an external device. Here, a normal camera sensitizes a silver halide photographic film with a light image of a subject, whereas the digital camera 1300 generates an image signal by photoelectrically converting the light image of a subject with an image element such as a CCD (Charge Coupled Device).

A display unit 1310 is provided on the back surface of a case 1302 in the digital camera 1300, configured to perform display based on an imaging signal from the CCD. The display unit 1310 functions as a finder that displays an object as an electronic image. In addition, a light receiving unit 1304 including an optical lens and the CCD is provided on the front side of the case 1302. When a photographer confirms a subject image displayed on the display unit 1310 and presses a shutter button 1306, an image pickup signal of the CCD is transferred to and stored in a memory 1308 at that time. In addition, in the digital camera 1300, a video signal output terminal 1312 and an input/output terminal 1314 for data communication are provided on the side surface of the case 1302. Therefore, a television monitor 1430 is coupled with the video signal output terminal 1312 and a personal computer 1440 is coupled with the input/output terminal 1314 for data communication as necessary. Furthermore, the imaging signal stored in the memory 1308 is output to a television monitor 1430 or a personal computer 1440 by a predetermined operation. For example, the digital camera 1300 includes the physical quantity sensor 310 that is the angular velocity sensor, and performs, for example, processes such as camera shake correction by using an output signal of the physical quantity sensor 310.

3. Vehicle

Figure 16:
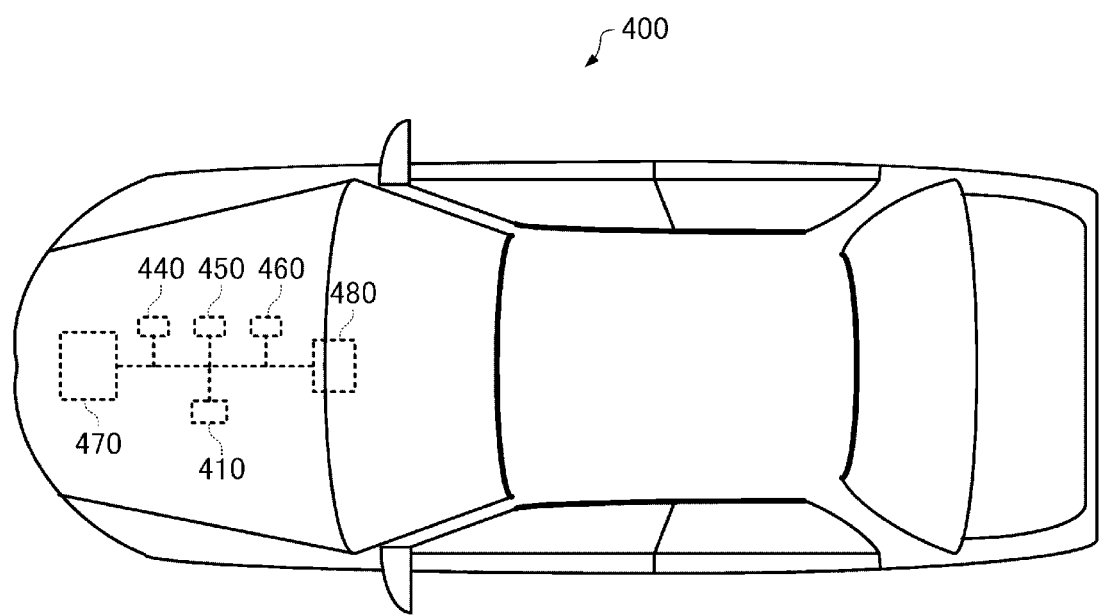
FIG. 16 is a diagram illustrating an example of a vehicle of the present embodiment.

FIG. 16 is a diagram illustrating an example of a vehicle of the present embodiment. A vehicle 400 illustrated in FIG. 16 includes a physical quantity sensor 410, controllers 440, 450, and 460, a battery 470, and a navigation device 480. The vehicle of the present embodiment may have a configuration in which some of the components in FIG. 16 are omitted or other components are added.

The physical quantity sensor 410, the controllers 440, 450, and 460, and the navigation device 480 are operated by a power supply voltage supplied from the battery 470.

The physical quantity sensor 410 outputs a detection result obtained by detecting the physical quantity to the controllers 440, 450, and 460.

Each of the controllers 440, 450, and 460 is a control device that performs various controls such as an attitude control system, a rollover prevention system, and a brake system by using an output signal of the physical quantity sensor 410.

The navigation device 480 displays the position of the vehicle 400, time, and other various types of information on a display, based on output information of the built-in GPS receiver. In addition, the navigation device 480 identifies the position and orientation of the vehicle 400 based on an output signal of the physical quantity sensor 410 even when GPS radio waves do not reach, and continues to display necessary information.

For example, each of the controllers 440, 450, and 460, and the navigation device 480 corresponds to the MCU 5 illustrated in FIG. 1.

For example, as the physical quantity sensor 410, by applying the physical quantity sensor 1 of the above-described embodiments, it is possible to realize, for example, a highly reliable vehicle.

As such a vehicle 400, various vehicles can be considered, and, for example, automobiles such as electric vehicles, aircrafts such as jets and helicopters, ships, rockets, artificial satellites, and the like can be included.

The above-described embodiments and modifications are merely examples, and the present disclosure is not limited to these. For example, each embodiment and each modification may be combined as appropriate.

The present disclosure includes configurations that are substantially the same as the configurations described in the embodiments (for example, configurations having the same functions, methods, and results, or configurations having the same objects and effects). In addition, the present disclosure includes a configuration in which a non-essential part of the configuration described in the embodiment is replaced. In addition, the present disclosure includes a configuration that achieves the same effect as the configuration described in the embodiment or a configuration that can achieve the same object. In addition, the present disclosure includes a configuration obtained by adding a known technique to the configuration described in the embodiment.

What is claimed is:

1. A physical quantity detection circuit comprising:
a passive filter that receives a first analog signal based on an output signal of a physical quantity detection element;
an analog/digital conversion circuit that includes an input capacitance and performs a sampling operation that samples a second analog signal based on an output signal of the passive filter at the input capacitance and performs a conversion operation that converts a result of the sampling operation into a digital signal, wherein the input capacitance includes an input capacitor array having a plurality of different individual capacitors having different capacitance values; and
a precharge circuit that is provided in a signal path between the passive filter and the analog/digital conversion circuit, and precharges the input capacitance, before the analog/digital conversion circuit samples the second analog signal at the input capacitance, wherein the precharge circuit includes
an operational amplifier,
a first chopper circuit that is provided in a signal path between the passive filter and the operational amplifier, and
a second chopper circuit that is provided in a signal path between the operational amplifier and the analog/digital conversion circuit, and
the first chopper circuit and the second chopper circuit perform a chopping operation
wherein the precharge circuit performs the precharge operation and the first chopper circuit and the second chopper circuit perform the chopping operation in parallel during a first period P1, the analog/digital conversion circuit performs the sampling operation and the first chopper circuit and the second chopper circuit perform the chopping operation in parallel during a second period P2 that is after the first period P1, and the analog/digital conversion circuit performs the conversion operation and the first chopper circuit and the second chopper circuit perform the chopping operation in parallel during a third period P3 that is after the second period P2.

2. The physical quantity detection circuit according to claim 1, wherein the passive filter is a low-pass filter.

3. The physical quantity detection circuit according to claim 1, wherein the analog/digital conversion circuit is a successive approximation type analog/digital conversion circuit.

4. The physical quantity detection circuit according to any one of claim 1, wherein each of the first analog signal and the second analog signal is a differential signal.

5. The physical quantity detection circuit according to any one of claim 1, further comprising:
a signal conversion circuit that converts an output signal of the physical quantity detection element into a voltage; and
a detection circuit that detects a third analog signal based on an output signal of the signal conversion circuit and outputs the first analog signal.

6. A physical quantity sensor comprising:
the physical quantity detection circuit according to any one of claim 1; and
the physical quantity detection element.

7. An electronic apparatus comprising:
the physical quantity sensor according to claim 6.

8. A vehicle comprising:
the physical quantity sensor according to claim 6.

9. An operation method of a physical quantity detection circuit including a passive filter that receives a first analog signal based on an output signal of a physical quantity detection element, an analog/digital conversion circuit that includes an input capacitance and converts a result obtained by sampling a second analog signal based on an output signal of the passive filter at the input capacitance into a digital signal, wherein the input capacitance includes an input capacitor array having a plurality of different individual capacitors having different capacitance values, and a precharge circuit that is provided in a signal path between the passive filter and the analog/digital conversion circuit, the precharge circuit including an operational amplifier, a first chopper circuit that is provided in a signal path between the passive filter and the operational amplifier, and a second chopper circuit that is provided in a signal path between the operational amplifier and the analog/digital conversion circuit, the method comprising:

a precharge step of precharging the input capacitance based on an output signal of the operational amplifier by the precharge circuit;

a sampling step of sampling the second analog signal at the input capacitance by the analog/digital conversion circuit after the precharge step;

a converting step of converting the result of the sampling step into a digital signal by the analog/digital conversion circuit after the sampling step; and a chopping step of performing a chopping operation by the first chopper circuit and the second chopper circuit, wherein the precharge step and the chopping step are performed in parallel during a first period P1, the sampling step and the chopping step are performed in parallel during a second period P2 that is after the first period P1, and the converting step and the chopping step are performed in parallel during a third period P3 that is after the second period P2.

* * * * *